United States Patent [19]
Gorrell et al.

[11] 3,815,445
[45] June 11, 1974

[54] VARIABLE SPEED PLANETARY TRANSMISSION

[75] Inventors: James M. Gorrell, Morton; James E. Winzeler, East Peoria, both of Ill.

[73] Assignee: Caterpillar Tractor Co., Peoria, Ill.

[22] Filed: Sept. 11, 1972

[21] Appl. No.: 287,603

[52] U.S. Cl. ............................ 74/740, 74/764
[51] Int. Cl. .................... F16h 37/00, F16h 57/10
[58] Field of Search .................. 74/764, 765, 740

[56] References Cited
UNITED STATES PATENTS

| | | | |
|---|---|---|---|
| 2,251,625 | 8/1941 | Hale | 74/764 X |
| 2,612,792 | 10/1952 | Wilson et al. | 74/764 X |
| 2,873,626 | 2/1959 | Granryd | 74/765 |
| 2,893,269 | 7/1959 | Morey et al. | 74/740 X |
| 3,021,729 | 2/1962 | Chambers et al. | 74/764 X |
| 3,290,962 | 12/1966 | McCann et al. | 74/760 |
| 3,381,546 | 5/1968 | Holl | 74/761 |
| 3,417,639 | 12/1968 | Johnson et al. | 74/764 X |
| 3,482,470 | 12/1969 | Miller | 74/765 X |
| 3,678,783 | 7/1972 | O'Malley et al. | 74/765 |

FOREIGN PATENTS OR APPLICATIONS

| | | | |
|---|---|---|---|
| 924,061 | 4/1963 | Great Britain | 74/765 |

*Primary Examiner*—Samuel Scott
*Assistant Examiner*—P. S. Lall
*Attorney, Agent, or Firm*—Phillips, Moore, Weissenberger, Lempio & Strabala

[57] ABSTRACT

A variable speed transmission of the type including a succession of planetary gear trains is adapted to provide a relatively uniform step or percentage change between speed ratios in order to provide efficient use of vehicle power and to minimize peaks in the vehicle performance curve. Four disclosed embodiments are commonly characterized by one planetary gear train in the variable speed transmission having its carrier coupled to a ring gear of an adjacent planetary gear train on the power input side of the transmission with the sun gear of the one planetary gear train being coupled with the carrier of the adjacent planetary gear train.

10 Claims, 6 Drawing Figures

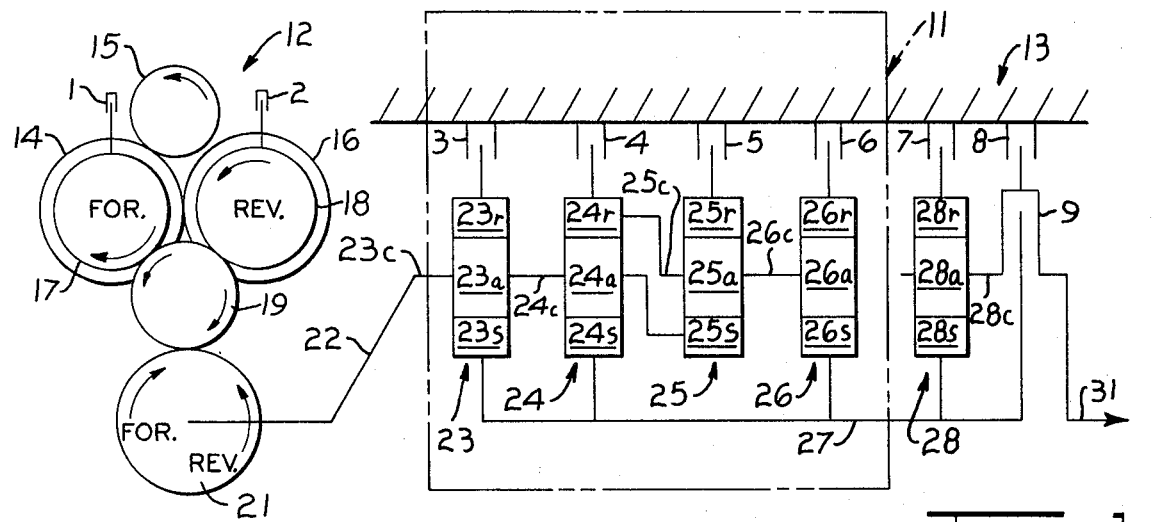
Fig. 1.
Fig. 3.
| SPEED RANGE | | 1 | 2 | 3 | 4 | 5 | 6 | 7 | 8 |
|---|---|---|---|---|---|---|---|---|---|
| CLUTCHES ENGAGED | FOR. | 1-6-7 | 1-5-7 | 1-4-7 | 1-3-7 | 1-6-8 | 1-5-8 | 1-4-8 | 1-3-8 |
| | REV | 2-6-7 | 2-5-7 | 2-4-7 | 2-3-7 | 2-6-8 | 2-5-8 | 2-4-8 | 2-3-8 |
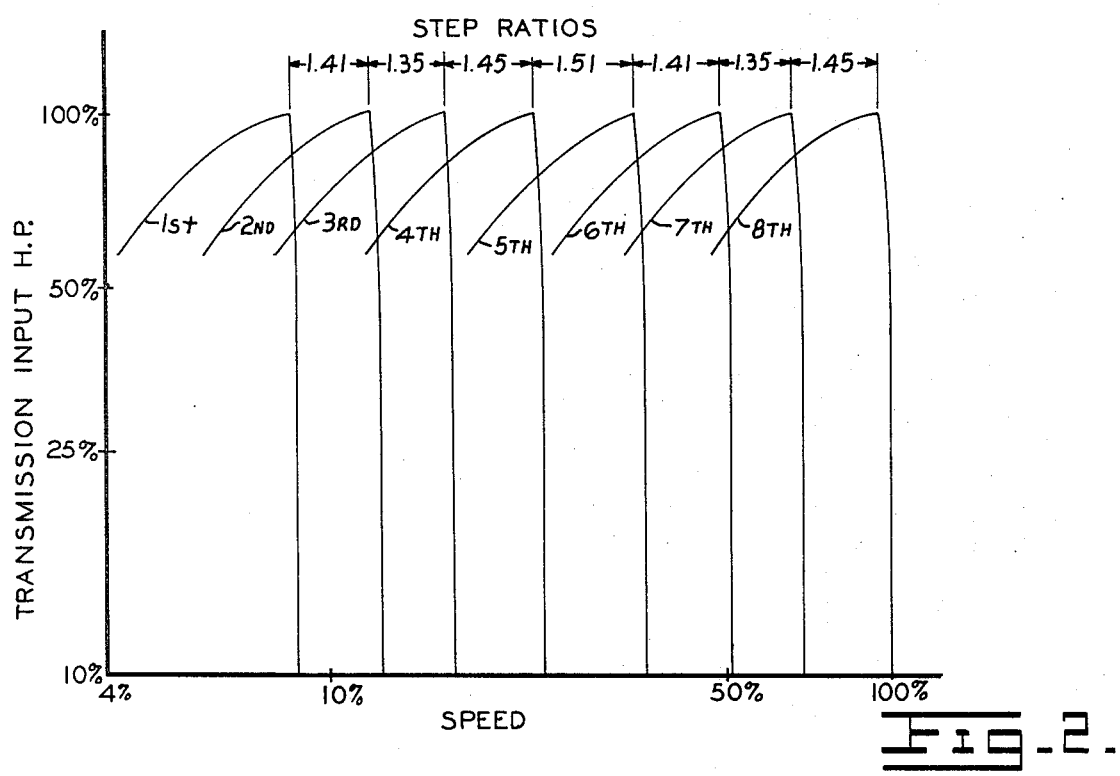
Fig. 2.

VARIABLE SPEED PLANETARY TRANSMISSION

BACKGROUND OF THE INVENTION

The present invention relates to a variable speed planetary transmission adapted to have a relatively uniform step or percentage change between speed ratios or ranges. In the following description, the invention is embodied in a transmission having a variable speed section providing four different speed ratios and a range section providing for operation of the transmission in high and low ranges so that the transmission effectively provides for eight speed ranges. However, it will be apparent from the following description that the invention is not limited to a transmission of this type but may be employed within any variable speed planetary transmission providing at least three different speed ratios.

Reference is made within the following description to U.S. Pat. No. 3,021,729, assigned to the assignee of the present invention, which is believed to represent the most pertinent prior art relative to the present invention. Reference is also made to U.S. Pat. No. 3,381,546, also assigned to the assignee of the present invention, as illustrating structural details for planetary gear trains of the type contemplated within the present invention.

In variable speed transmissions having at least three different speed ratios, it is desirable to maintain minimum steps between the ratios for more efficient operation and the present invention contemplates the maintaining of relatively uniform steps between the speed ratios for this purpose.

SUMMARY OF THE INVENTION

In order to maintain a relatively uniform step or percentage change between speed ratios established by a variable speed planetary transmission of the type having a succession of planetary gear trains, one of the planetary gear trains has its carrier coupled for rotation with the ring gear of an adjacent planetary gear train toward the power input side of the transmission with the sun gear of the one planetary gear train being coupled for rotation with the carrier of the adjacent planetary gear train.

Four variations or embodiments of a variable speed transmission are described below, each including the basic combination of the present invention. In each of these preferred embodiments, it will be noted that the one planetary gear train referred to above is an intermediate planetary gear train within the transmission and additional planetary gear trains may be employed to provide a desired number of speed ratios.

Additional objects and advantages of the present invention are made apparent in the following description having reference to the accompanying drawings.

BRIEF DESCRIPTION OF THE DRAWINGS

FIG. 1 is a schematic representation of a transmission including a variable speed planetary section constructed according to the present invention, a range section for multiplying the number of speed ratios provided by the variable speed section and a transfer section for changing operating direction.

FIG. 2 is a graphical representation of the relatively uniform step or percentage change between the various speed ratios provided by the transmission of FIG. 1.

FIG. 3 sets forth in tabular form the various brakes and clutches which are engaged within the transmission to provide the various speed ranges or ratios in each operating direction.

DETAILED DESCRIPTION OF INVENTION EMBODIMENTS

Figure 4:
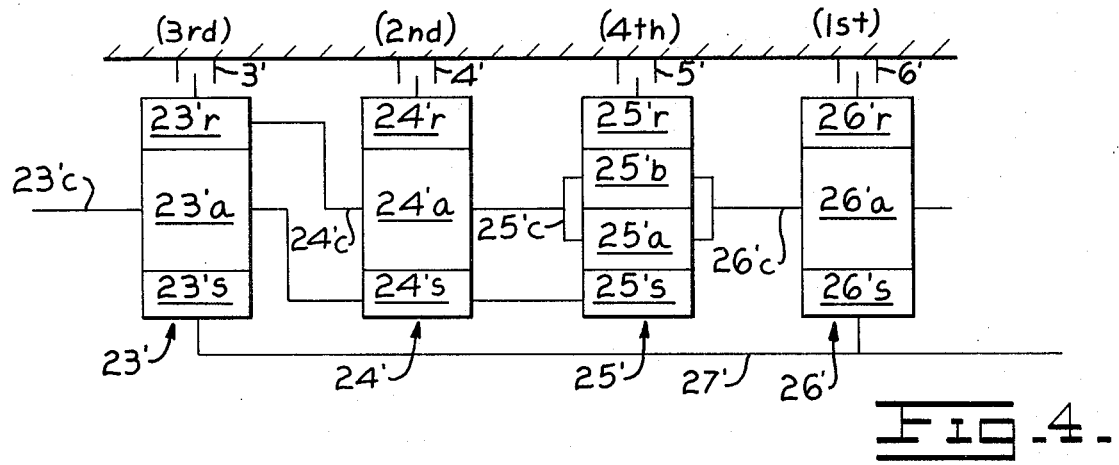
FIGS. 4 – 6 are schematic representations of respective alternate embodiments for a variable speed planetary transmission constructed according to the present invention.

The transmission illustrated in FIG. 1 comprises a variable speed planetary transmission section 11 constructed according to the present invention and arranged in operating alignment with a transfer section 12 for establishing operating direction and a range section 13 which effectively multiplies the number of speed ratios established by the transmission variable speed section 11.

These three transmission sections are operated by a plurality of brakes 3–8 and clutches 1, 2 and 9, the location and operation of the brakes and clutch being set forth in greater detail below. For purposes of the present invention, it is generally noted that the brakes 3–8 and clutches 1, 2 and 9 may be composed of interleaved plates with hydraulic cylinder means (not shown) conventionally providing for selective engagement and disengagement of the brakes and clutches.

The transfer section 12 includes an input gear 15 coupled to an engine or prime mover (not shown) in a conventional manner. The input gear 15 drives a forward input clutch gear 14 which in turn meshes with a reverse input clutch gear 16. A forward input directional clutch 1 selectively couples the input clutch gear 14 with a forward output clutch gear 17. Similarly, a reverse input directional clutch 2 selectively couples the input clutch gear 16 with a reverse output clutch gear 18. An idler gear 19 is arranged in meshing engagement with both of the output clutch gears 17 and 18 as well as a final output gear 21 which is operatively coupled with a power input shaft 22 of the variable speed transmission section 11. Accordingly, the input shaft 22 is driven in one direction corresponding to forward operation while the clutch 1 is engaged. The shaft 22 is driven in an opposite direction corresponding to reverse operation when the clutch 2 is engaged.

The variable speed transmission section 11 comprises a succession or plurality of planetary gear trains respectively indicated at 23, 24, 25 and 26. The succession of planetary gear trains is operated in a generally conventional manner by the brakes 3–6 which may be selectively actuated to prevent rotation of a ring gear in each of the planetary gear trains. The interconnection of the planetary drive train 25 with the adjacent or preceding gear train 24 is of particular importance within the present invention for establishing the relatively uniform step or percentage change between the various speed ratios established by engagement of the respective brakes 3–6.

Each of the planetary gear trains 23–26 includes a sun gear indicated by the letter $s$, a ring gear indicated by the letter $r$ and intermediate planet gears or gear sets indicated by the letters $a$ and $b$. It will be noted that the carriers 23c and 24c are coupled together as are the carriers 25c and 26c. Further, the sun gears 23s, 24s and 26s are coupled to a common center shaft 27.

Referring particularly to the planetary gear train 25, it is to be noted that its carrier 25c is coupled with the ring gear 24r for the adjacent planetary gear train 24 which is on the power input side of the transmission section 11 from the planetary gear train 25. Further, the sun gear 25s is coupled for rotation with the carrier 24a of the adjacent planetary gear train 24. This novel interconnection between the planetary gear trains 25 and 24 has been found to permit very uniform steps between speed ratios as is generally illustrated in FIG. 2 and discussed in greater detail below. It is also to be noted that while this constructional feature is believed to be important in establishing the uniform steps between the ratios, the actual percentage change between the ratios is established in a conventional manner by selection of the number of teeth (not shown) on the various gears of each planetary gear train.

The range transmission section 13 includes a similar planetary gear train 28 having its ring gear 28r controlled by the brake 7 and its sun gear 28s coupled for rotation with the center shaft 27. Thus, the center shaft 27 serves as a power output shaft or member for the variable speed transmission section 11 and transmits power to the range section 13. The carrier 28c in the range section is coupled with a power output shaft 31 which may be coupled to driven ground wheels of a vehicle (not shown) in a conventional manner. The brake 7 in the range transmission section 13 is engaged to lock the ring gear 28r from rotation and to establish speed ranges 1–4 for the overall transmission in conjunction with engagement of selective brakes 3–6 in the variable speed transmission section 11 as indicated in FIG. 3. Clutch 9 is engaged to lock the carrier 28c for rotation with the center shaft 27 to establish a high operating range including speed ranges 5–8 which are also indicated in FIG. 3. Brake 8 is a parking brake for the transmission.

It is again noted that FIG. 3 indicates the various brakes and clutches which are to be engaged for each speed range in each direction of operation. Of greater importance, it is noted in FIG. 2 that a very uniform step or percentage change between the various speed ranges is established by the multi-speed planetary transmission of the present invention. The tooth configuration of the various planetary gear trains has been selected in a conventional manner as noted above to establish the fractional change between the various speed ranges at approximately 1.4. The uniform step between speed ranges 1–4 and between speed ranges 5–8, in particular, is made possible by the interconnection of the planetary gear trains within the variable speed transmission section 11.

Figure 5:
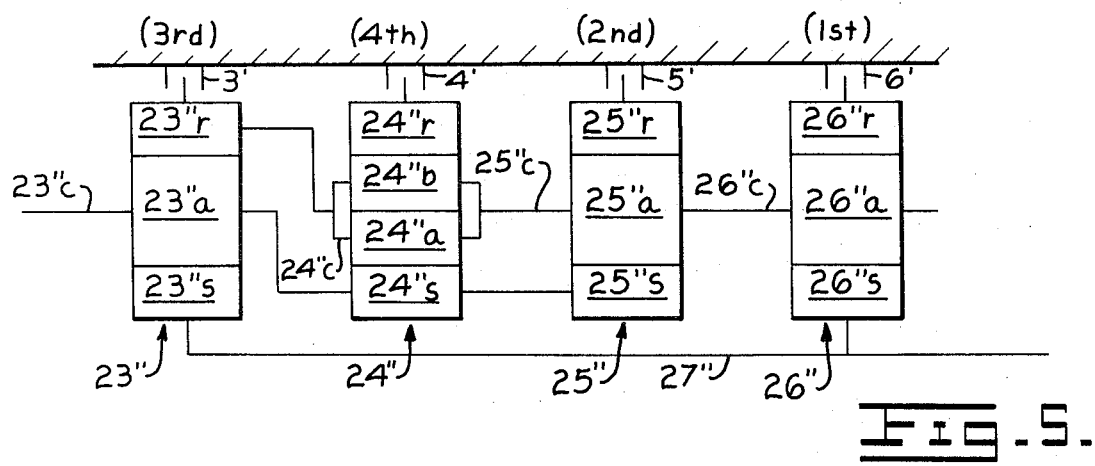
Figure 6:
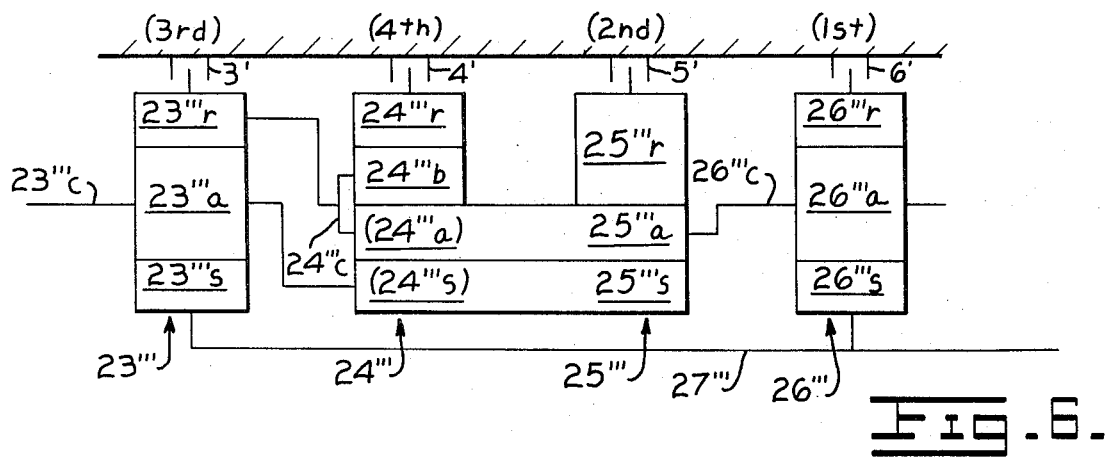

FIGS. 4–6 illustrate additional designs for the variable speed transmission section 11 within the scope of the present invention. While the present invention is not limited to the four embodiments described herein, the four illustrated embodiments serve to illustrate the scope of the invention. Elements of the transmission sections in FIGS. 4–6 which correspond to elements in FIG. 1 are indicated by primed numerals. However, it is to be noted that the various brakes in FIGS. 4–6 will not establish the same speed range or speed ratio as indicated by FIG. 3 for the embodiment of FIG. 1. Accordingly, the relative speed ratio established by each of the brakes in FIGS. 4–6 is indicated parenthetically above each of the respective brakes.

Referring particularly to FIG. 4, it may be noted that the interconnection between the one planetary gear train 24' and the adjacent planetary gear train 23' is similar to the interconnection between the planetary gear trains 25 and 24 of FIG. 1. However, only the sun gears 23's and 26's are coupled to the center shaft 27'. The sun gear 25's of the planetary gear train 25' is coupled directly to the sun gear 24's. It is also noted that the planetary gear train 25' has both inner and outer planet gears 25'a and 25'b supported by a common carrier 25'c. With these variations, the tooth configurations of the various planetary gear trains in FIG. 4 may also be selected to establish uniform step ratios of the type shown by FIG. 2 for the embodiment of FIG. 1.

Referring now to FIG. 5, it is again noted that the interconnection between planetary gear trains 23'' and 24'' corresponds to the interconnection between planetary gear trains 25 and 24 of FIG. 1. Otherwise, the embodiment of FIG. 5 is similarly constructed as the embodiment of FIG. 4 with the exception that the planetary gear train 24'' includes inner and outer planet gears with a common carrier similar to the planetary gear train 25' in FIG. 4.

FIG. 6 illustrates yet another version wherein portions of the two planetary gear trains 24''' and 25''' are formed in common. The construction of this embodiment may also be understood by reference for example to U.S. Pat. No. 3,381,546 wherein components are shared in a generally similar manner by adjoining planetary gear trains. Referring now to FIG. 6, it is again noted that the interconnection between planetary gear trains 24''' and 23''' generally corresponds with the interconnection between planetary gear trains 25 and 24 in FIG. 1. However, the planet gears 25'''a for the planetary gear train 25''' also serve as inner planet gears (24'''a) for the planetary gear train 24'''. The common planet gears mesh with the ring gear 25'''r while outer planet gears 24'''b are supported by the common carrier 24'''c for meshing engagement with the ring gear 24'''r. The planetary gear trains 24''' and 25''' also have a common sun gear which, as noted above, is coupled with the carrier 23'''c.

What is claimed is:

1. In a variable speed transmission having a plurality of planetary gear trains coupled in succession between a transmission power input shaft and a transmission power output shaft, each planetary gear train including a sun gear, planet gear set, carrier, ring gear and brake means for selectively stopping the ring gear, the improvement comprising the sun gear of one planetary gear train being coupled with the carrier of an adjacent planetary gear train on the power input side of the one planetary gear train and the carrier of the one gear train being coupled with the ring gear of the adjacent planetary gear train, the carrier of the adjacent planetary gear train being operatively coupled for rotation with the power input shaft, another planetary gear train being arranged on the power output side of the one planetary gear train, the carrier of the other planetary gear train being operatively coupled for rotation with the carrier of the one planetary gear train, and further comprising a common center shaft extending through the succession of planetary gear trains, the sun gear of the adjacent planetary gear train being coupled to the center shaft, the sun gear of the other planetary gear train also being coupled to the center shaft with the center shaft being operatively coupled for driving the output shaft, an additional planetary gear train having its carrier coupled to the carrier of a selected planetary gear train in the succession and having its sun gear coupled to the center shaft.

2. The transmission of claim 1 wherein the other planetary gear train has an inner planet gear and an outer planet gear with a common carrier, the sun gear of the other planetary gear train being coupled with the sun gear of the one planetary gear train.

3. The transmission of claim 2 further comprising an additional planetary gear train having its carrier coupled to the common carrier of the other planetary gear train and having its sun gear coupled to the center shaft.

4. The transmission of claim 1 wherein the one planetary gear train has an inner planet gear and an outer planet gear with a common carrier, the sun gear of the other planetary gear train being coupled with the sun gear of the one planetary gear train.

5. The transmission of claim 4 further comprising an additional planetary gear train having its carrier coupled to the carrier of the other planetary gear train and having its sun gear coupled to the center shaft.

6. The transmission of claim 1 wherein the one planetary gear train has an inner planet gear and an outer planet gear with a common carrier, the inner planet gear being elongated to also serve as a planet gear for the other planetary gear train.

7. The transmission of claim 6 wherein the inner planet gear of the one planetary gear train also engages the ring gear of the other planetary gear train, the sun gear of the one planetary gear train also serving as the sun gear for the other planetary gear train.

8. The transmission of claim 7 further comprising an additional planetary gear train having its carrier coupled to the carrier of the other planetary gear train and having its sun gear coupled to the center shaft.

9. The transmission of claim 1 further comprising multi-range means coupling the succession of planetary gear trains with the output shaft.

10. The transmission of claim 9 wherein the multi-range means comprises a range planetary gear train having its carrier operatively coupled with the transmission output shaft and its sun gear coupled with the common center shaft, clutch means being arranged between the center shaft and the carrier of the range planetary gear train, a separate brake means being operable to stop a ring gear of the range planetary gear train.

* * * * *